United States Patent [19]
Burroughs et al.

[11] Patent Number: 5,956,730
[45] Date of Patent: Sep. 21, 1999

[54] LEGACY SUBCLASSING

[75] Inventors: Tracy Kim Burroughs, Byron; Wilson D. Lee; Cynthia Ann Rogers, both of Rochester; Laura Jane Zaborowski, Winona, all of Minn.

[73] Assignee: International Business Machines Corporation, Armonk, N.Y.

[21] Appl. No.: 08/912,020

[22] Filed: Aug. 15, 1997

[51] Int. Cl.⁶ .................................................. G06F 17/30
[52] U.S. Cl. .......................... 707/104; 707/103; 707/102; 395/683
[58] Field of Search .............................. 707/10, 103, 104; 707/102; 395/683

[56] References Cited

U.S. PATENT DOCUMENTS

| | | | |
|---|---|---|---|
| 5,542,078 | 7/1996 | Martel et al. | 395/600 |
| 5,604,892 | 2/1997 | Nuttall et al. | 395/500 |
| 5,613,099 | 3/1997 | Eriickson et al. | 395/500 |
| 5,627,979 | 5/1997 | Chang et al. | 395/335 |
| 5,692,183 | 11/1997 | Hapner et al. | 395/614 |
| 5,694,598 | 12/1997 | Durand et al. | 395/614 |
| 5,729,739 | 3/1998 | Cantin et al. | 395/614 |
| 5,737,597 | 4/1998 | Blackman et al. | 395/613 |
| 5,799,310 | 8/1998 | Anderson et al. | 707/102 |
| 5,832,496 | 11/1998 | Anand et al. | 707/102 |
| 5,870,746 | 2/1999 | Knutson et al. | 707/101 |
| 5,870,749 | 2/1999 | Adusumilli | 707/101 |

OTHER PUBLICATIONS

Enabling the Integration of Object Applications with Relational Databases, by Arthur Keller, Ph.D., Richard Jensen, and Shailesh Agrawal, Ph.D., Persistence Software, Mar. 24, 1997 Inc.,www.persistence.com/pesr...ce/pagetwo.pages/technoview.html, pp. 1–9.

Java Relational Binding Delivers Transparent Java Access to Relational Databases, http://www.O2tech.com, O₂ Technology, Oct. 7, 1996.
XDB's Jet Series (Java Enterprise Tools), XDB Systems, http://www.xdb.com/jet, Mar. 24, 1997.
Jetstore, XDB Systems, http://www.xdb.com/jet/store, p. 1, Mar. 24, 1997.
Jetassist Instant Database Applet Development for Java, XDB Systems, http://www.xdb.com/jet/assist, pp. 1–2, Mar. 24, 1997.
Jetconnect Universal Database Access for Java, XDB Systems, http://www.xdb.com/jet/connect, pp. 1–2, Mar. 24, 1997.
ObjectStore DBconnect, ObjectStore Database for the Web http://www.odi.com/products/apc/ap_connect.html, pp. 1–5, Mar. 24, 1997.
Welcome to O₂ Technology Database Solutions for Object Developers, http://www.O2tech.fr, pp. 1–2, Mar. 24, 1997.

*Primary Examiner*—Paul V. Kulik
*Assistant Examiner*—Michael J. Wallace, Jr.
*Attorney, Agent, or Firm*—Lawrence D. Maxwell

[57] ABSTRACT

A method and system for mapping between relational schema and object schema, wherein the relational schema includes a table having a tiebreaker column. In accordance with the present invention, an object-oriented application program may instantiate a persistent dependent object with one of two or more specific instances that is selected in response to the value of a data element in a tiebreaker column. Alternatively, an object-oriented application program may instantiate a persistent entity object in accordance with one of two or more entity classes that is selected in response to the value of a data element in a tiebreaker column.

14 Claims, 9 Drawing Sheets

Microfiche Appendix Included
(1 Microfiche, 24 Pages)

LEGACY SUBCLASSING

A Microfiche Appendix consisting of one microfiche, 24 frames, is included in this disclosure. A portion of this disclosure contains material that is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

CROSS-REFERENCE TO RELATED APPLICATION

Serial No. 08/883,838, filed Jun. 26, 1997, titled "DEPENDENT PERSISTENCE," is related.

BACKGROUND OF THE INVENTION

1. Field of the Invention

The present invention relates generally to object-oriented computing and relational data store systems and, more specifically, to mapping between object schema and relational schema in which legacy or preexisting relational data has been subclassed.

2. Description of the Related Art

Businesses commonly need to store and access large quantities of data relating to specific business matters, such as their financial accounts, inventory, customers, employees, and other matters. Businesses use computers, of course, to aid this task. Businesses have invested billions of dollars in computer systems that store and access such business data. To minimize losses on this investment in computer systems, an important consideration in introducing new computer technology is adapting it to interface with existing computer technology.

A database is a structure in which a computer system may store a large quantity of data organized in a manner that facilitates efficient storage, search and retrieval. Physically, at the heart of any database is some suitable type of data store, such as magnetic disks, on which data may be recorded. Nevertheless, computer scientists and other researchers have developed a number of different conceptual models under which databases may be constructed.

The most prevalent database model is known as a relational database. In a relational database the data are organized in tables, also referred to as relations. Each data element in a table is indexed by its row and column in the table. Each row, also known as a tuple, represents an entity that is useful or meaningful to the business or other database user, and each column in that row refers to a data element that defines a characteristic or attribute of that entity. For example, each row in a company's database of its employees may refer to a certain employee. One column may refer to an employee's name, another column to an employee's identification number, and another column to an employee's address. Certain columns may be designated as "keys" to uniquely identify each row. For example, the column referring to an employee's name may be defined as a key. Keys may include primary keys, which are used as the primary means to access the rows, and foreign keys, which are used to define links between tables. The programmer who creates the database has considerable latitude in specifying the rows, columns, keys, and other characteristics that define the schema of a relational database.

The above-described data model underlying relational databases was developed to facilitate the storage and retrieval of data under the control of programming languages of the type that were prevalent at the time, which were primarily those known as procedural or structured programming languages. Because procedural programming languages and relational databases were for many years being developed and improved upon contemporaneously with one another, procedural languages are, not surprisingly, well-suited to manipulating relational database data. For example, a feature of most procedural programming languages allows a programmer to access an element of a table by specifying its row and column. Although a program would not necessarily access a database element using that feature of the programming language, the point to note is that relational schema and procedural programming share common concepts and programming philosophies.

Another type of programming, known as object-oriented programming (OOP), is becoming increasingly popular and may eventually supplant procedural programming. A potential problem, however, is that OOP languages do not inherently interface smoothly with relational databases. For example, the concept of indexing a table of data elements by row and column is in itself somewhat at odds with the OOP philosophy of handling an object in accordance with what it represents rather than how it is represented in a rigid data structure.

The goal of OOP is to reduce the time and costs associated with developing complex software by creating small, reusable sections of program code that can be quickly and easily combined and re-used to create new programs. The code sections are known as objects. OOP languages, such as Smalltalk, C++, and Java, have been developed that allow programmers to approach their programming tasks in a way that is believed to be more natural and intuitive than that in which programmers traditionally approached tasks armed with only the tools of procedural programming languages. Using the unique tools or features of an OOP language, which are described below in further detail, a programmer can write code to define a software object that models something in the real world. The software object may model the attributes or characteristics of the real-world object and, in many cases, may also model its behavior. For example, a programmer whose task it is to create an employee database program can create an object that models an employee. An employee object may have certain attributes of a real employee, such as a name, an address, an employee number, and so forth. Exploiting the full capabilities of OOP, a programmer could use the employee object in a program in a manner that roughly corresponds to the way one would interact with a real employee. For example, the programmer could define the employee object to provide its address when the object is asked for that information or to provide its status, such as "on vacation," when asked for status information. It should be noted that accessing an element of a table by specifying a row and column is a concept foreign to object-oriented programmers and not in keeping with the OOP philosophy of modeling things in the real world in a natural, intuitive manner.

Object-oriented databases (OODBs) that are specifically designed to facilitate storage and retrieval of objects have been developed. Objects that are stored in a data store are known as persistent objects because they "persist" after the program that created them ceases executing.

Despite the recent development of dedicated OODBs, businesses have invested billions of dollars over the years in their existing or legacy relational databases. It would be an extraordinarily uneconomical task to transfer all legacy relational data into OODBs. Furthermore, relational databases are continuing to be developed and improved and remain widely commercially available. Therefore, software has been developed that interfaces object-oriented software to relational databases. Such software typically includes a development tool, sometimes referred to as a schema mapper, that allows a database programmer to map the object schema to the relational schema. The software also typically includes a call-level interface. The call-level interface acts as a translator between an object-oriented application program and a relational database. Thus, although the objects are ultimately stored in relational format, the storage format is transparent to the application program, which may access them in the same manner as it would a persistent object in a dedicated OODB. An example of such software is described in U.S. Pat. No. 5,627,979, titled "A SYSTEM AND METHOD FOR PROVIDING A GRAPHICAL USER INTERFACE FOR MAPPING AND ACCESSING OBJECTS IN DATA STORES," (IBM Docket ST9-94-017) incorporated herein by reference, and its related U.S. patent application Ser. No. 08/276,382, filed Jul. 18, 1994, titled "A SYSTEM AND METHOD FOR MAPPING AND ACCESSING OBJECTS IN DATA STORES" (IBM Docket ST9-94-016).

The present invention addresses the problems involved in mapping between an object-oriented schema and a legacy relational schema that includes a "tiebreaker" column. It is known that a relational database table may include a tiebreaker column, also known as a type column. A tiebreaker column is used in relational databases as a switch to select a legacy subclass or meaning for one or more other columns from among two or more possible legacy subclasses or meanings. For example, a tiebreaker column may have been included in a legacy database to select whether the data in one or more columns relating to an employee related to an active employee or a retired employee. The character "A" in the tiebreaker column may have been used to indicate an active employee, and the character "R" in the tiebreaker column may have been used to indicate a retired employee.

It would be desirable to provide a schema mapping method and system that allows a programmer to use a tiebreaker column of a legacy relational database in an object-oriented application program. Furthermore, it would be desirable for the method and system to be sufficiently flexible to map different types of persistent objects. These problems are satisfied by the present invention in the manner described below.

SUMMARY OF THE INVENTION

The present invention relates to a method and system for mapping between relational schema and object schema, wherein the relational schema includes a table having a tiebreaker column. In accordance with the present invention, an object-oriented application program may instantiate a persistent dependent object with one of two or more specific instances that is selected in response to the value of a data element in a tiebreaker column. Alternatively, an object-oriented application program may instantiate a persistent entity object in accordance with one of two or more entity classes that is selected in response to the value of a data element in a tiebreaker column.

The term "dependent object" or "dependent" is used in this patent specification to refer to an object that is contained (by value, as opposed to by reference) within another object, and that an application program cannot reference directly but rather can only reference indirectly by referencing the object containing the dependent. The term "entity object" or "entity" is used in this patent specification to refer to the more typical type of object to distinguish it from a dependent object. In accordance with this definition, an entity may contain one or more dependents.

Prior to the time an application program is run, schema mapping language is generated that defines the mapping from object schema to relational schema. The schema mapping language may be generated by a programmer either manually or with the aid of a schema mapper tool. The schema mapping language may parsed or interpreted or may be pre-compiled to produce a schema map object containing the appropriate schema map code.

The invention addresses the problem that, in the case of a persistent entity, an application program cannot readily retrieve it from a legacy relational database, i.e., instantiate it and restore its instance variables with values read from the data store, where a tiebreaker column has been in the legacy schema as a switch to select a legacy subclass from among two or more legacy subclasses. The class name of an entity is generally included in a handle that is available to the application program. At run-time, an application program may initiate a request for the handle of an entity. In accordance with the present invention, in response to a request for a handle, the services of the schema map object are invoked. The schema map object reads the tiebreaker column and selects a class in response to the value stored there. The schema map object constructs a handle that includes the selected class name. The application program may then use the handle to complete the retrieval of the entity from the data store.

The invention also addresses the problem that, in the case of a dependent, an application program cannot readily create the proper specific instance of the dependent at the time it is to be retrieved from a data store where a tiebreaker column has been in the legacy schema as a switch to select a legacy subclass from among two or more legacy subclasses. A "specific instance," as the term is used in this patent specification, refers to an instance of an object that is identifiable and distinguishable from other instances of an object by a name or memory address uniquely associated with it. At run-time, an application program may request that an entity having one or more dependents be retrieved from a data store. In accordance with the present invention, in response to such a request, the schema map object reads the tiebreaker column and selects a specific instance of the dependent in accordance with the value stored there. The application program, cooperating with the schema map object, may then instantiate the dependent (and its containing entity) with the proper instance name.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

The present invention relates to a method and system for mapping an object, which may be an entity object or a dependent object, between object-oriented schema and relational data store schema. An Overview section is provided below for the benefit of readers who are not generally familiar with schema mapping and the problem relating to legacy tiebreaker columns that the present invention addresses. Readers who are skilled in the art of OOP technology and understand the concept of relational subclassing using a tiebreaker column may wish to skip the Overview section and proceed directly to the Detailed Description section of this specification.

1. Overview

OOP differs from standard procedural programming in that it uses objects rather than procedures as the fundamental building blocks for creating computer programs. Both objects and procedures are embodied as sections of code that may be written in a high-level language. Nevertheless, how a programmer uses objects to design programs differs greatly from how a programmer uses procedures. Both OOP and procedural programming have as a goal to break a programming task into smaller, more manageable subtasks. Although a procedural programmer may break a program into a hierarchy of procedures, each of which performs an algorithm, the procedures are generally not autonomous. Thus, although a procedure lower in the hierarchy potentially could be re-used in a different program by a different procedure higher in the hierarchy, such re-use of code is not nearly as straightforward or intuitive as the re-use of objects.

A fundamental concept in OOP is the class. A class is a template or prototype that defines a type of object. A programmer may define a class by writing a section of code known as a class definition. An object is an instance of a class. An object is created or instantiated at run-time, i.e., when the computer executes a statement in the program calling for the instantiation of an object of a specified class. An object may include attributes or data as well as functions or methods. The class definition specifies the attributes and methods. The attributes are represented in an object by the values of instance variables.

Another important concept of OOP is encapsulation. Often, an object may perform its function without needing to reveal its implementation or internal data. A class definition may specify that the data of objects of that class is private and cannot be retrieved by another object. Objects must communicate with one another via their object interfaces, and the data may be encapsulated by limiting access to it through the object interface. Such data can only be modified by the object methods.

Another important concept of OOP is inheritance. Inheritance is the ability to derive a new class from one or more existing classes. The new class, known as a subclass, may inherit or incorporate all properties of a base class, including its attributes and its methods. The new class or subclass may be defined to include additional properties.

Objects communicate with one another by sending and receiving messages. A powerful concept of OOP, known as polymorphism, is that objects of different classes may respond to the same message in different ways.

Encapsulation, inheritance and polymorphism are three important concepts that differentiate OOP from procedural programming. Another concept that is featured in many OOP languages is known as aggregation or containment by-value. A dependent is a type of aggregation. A dependent object differs from other types of objects in that it is not shared. Rather, a dependent object is contained within another object, which may be referred o as an entity to distinguish it from dependents and other classes of objects.

A framework is a collection of base classes that extends the power of object-oriented systems. Stated another way, a framework is a set of cooperating classes that make up a reusable, extensible architecture. A framework functions as the operating environment. A programmer can use the base classes to derive more specialized classes that represent business objects or entities.

A persistent object can be preserved beyond the termination of the process that created that object. A framework that supports persistent objects includes methods that allow persistent objects to be stored in and retrieved from a non-volatile data store, such as a magnetic disk or writeable optical disk. In the environment of a preferred framework, the dependent objects referred to in this specification are only persistent when contained in an entity. That entity "owns" the dependent. The life cycle of a persistent dependent object does not exceed that of its containing entity. When the containing entity is deleted, all of its contained dependent objects are deleted.

The choice of whether to make a class a dependent class or an independent class provides a programmer with flexibility. On one hand, an entity (i.e., an object of an independent class) maximizes subclassing flexibility for the programmer. On the other hand, an entity may degrade system performance somewhat due to the system overhead involved. Some system overhead is incurred in obtaining the handle. Other system overhead is incurred in restoring the instance variables of the entity, also known as "fluffing" the entity. A dependent is instantiated and fluffed when its containing entity is instantiated and fluffed. If the same object were designated by the programmer as an entity rather than a dependent, it would not be instantiated and fluffed until its handle was referenced during program execution, a process sometimes known as lazy instantiation. Because programmers are familiar with such performance/ flexibility tradeoffs, such considerations are not discussed further in this specification.

As described above, schema mapping allows an object-oriented program to persist objects in a relational database.

Legacy or existing relational databases may include a tiebreaker column. A tiebreaker column is used in relational databases as a switch to select a legacy subclass from among two or more possible legacy subclasses for the other columns. (The term "legacy subclasses" is used in its ordinary sense in the preceding sentence and should not be confused with the word as used in the context of object-oriented programming (OOP), which is discussed in further detail below in the Overview section.) In the example briefly noted above, a table for a business database in which each row represents an employee may include a column that selects whether the other columns of that row, such as employee name, address, and serial number, relate to an active employee or a retired employee. For example, an "A" stored in the tiebreaker column may indicate an active employee, and an "R" stored in the tiebreaker column may indicate a retired employee. Similarly, for example, a table for a business database in which each row represents a customer order may include a column that selects whether the columns relating to an address, such as street, city and zipcode columns, represent the address to which the order should be delivered or the address to which confirmation of the order should be sent. A "D" stored in the tiebreaker column may indicate a delivery address, and a "C" stored in the tiebreaker column may indicate a confirmation address.

Although in the former example the database could simply have included a table for active employees and another table for retired employees, database administrators more commonly included only one table plus a tiebreaker column, because two tables would include duplicate employee names, addresses and so forth, as active employees retired. Database administrators avoided such duplication because memory was far less economical in prior times that at the present date. Similarly, although in the latter example the database could simply have included a table having columns for both delivery address information and confirmation address information, it was preferable in prior times to include only a single set of such columns plus a tiebreaker column. With the cost of data store memory of relatively little concern today, database administrators may in fact design relational databases that include a certain amount of redundant information in the interest of eliminating tiebreaker columns. Nevertheless, legacy relational databases continue to be used and are beginning to be interfaced with object-oriented application programs by means of schema mapping. The present invention relates to the schema mapping problems that arise due to the presence of tiebreaker columns in legacy database tables.

2. Detailed Description

When an application program attempts to retrieve a persistent object from a relational data store having tiebreaker columns, the schema map may make a selection in accordance with the tiebreaker column. The present invention allows an application programmer to use a legacy tiebreaker column in one of two ways, i.e., to make one of two types of selections. One type relates to the mapping of entity objects, and the other type relates to the mapping of dependent objects.

Figure 1:
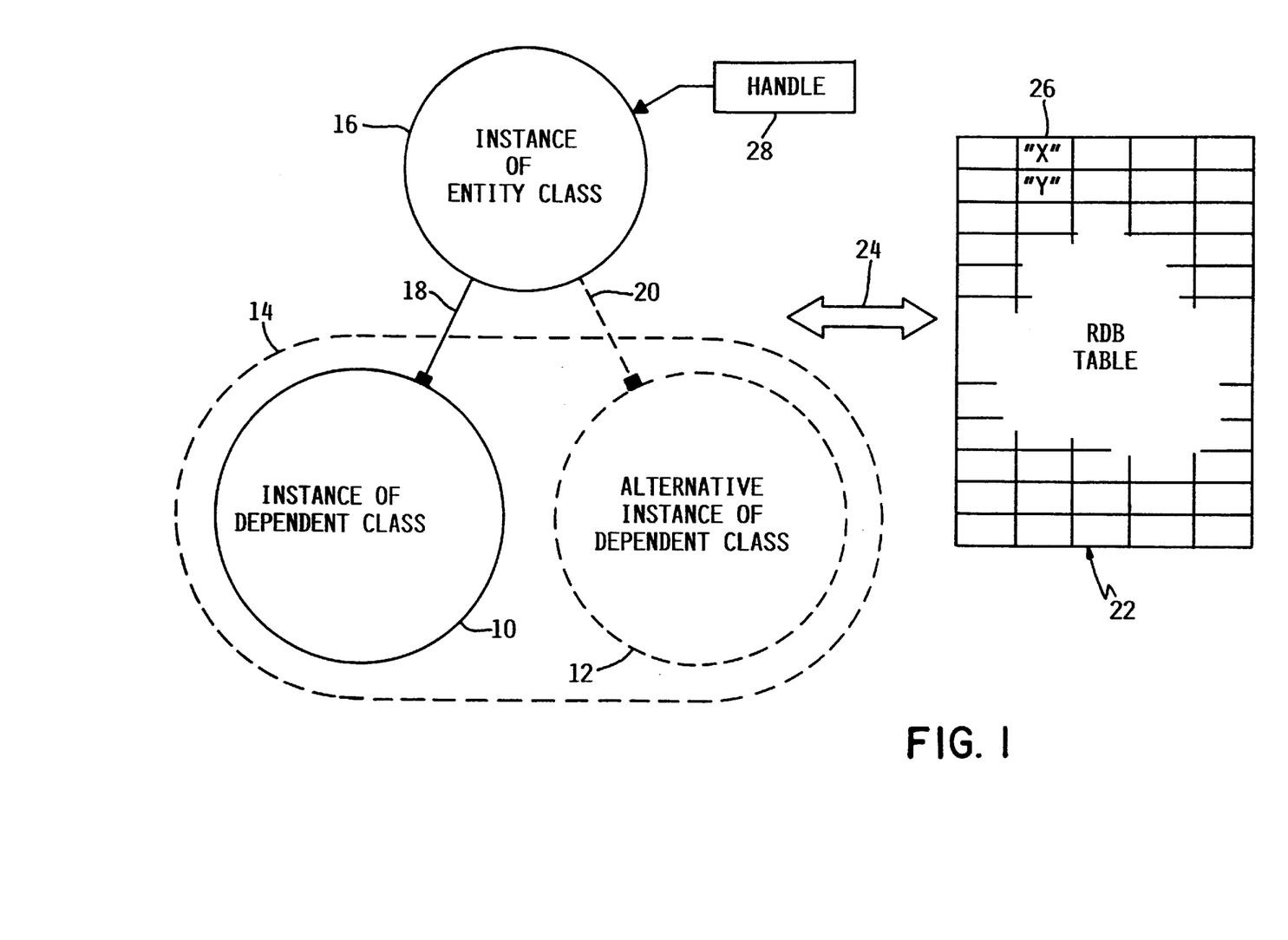
FIG. 1 illustrates mapping dependents between object schema and relational schema in accordance with a relational table having a tiebreaker column.

As illustrated in FIG. 1, in the case of mapping dependent objects, the present invention facilitates selection of a dependent object (which may be referred to for convenience simply as a "dependent") from among two or more of them, such as between two dependents 10 and 12. Dependents 10 and 12 are alternative instances of a dependent class 14; they do not both exist simultaneously. The conceptual connections 18 and 20 between the entity object 16 (which may be referred to for convenience simply as an "entity") and dependents 10 and 12 are intended to indicate that dependents and 12 are contained by value in entity 10. Either dependent 10 or dependent 12 (but not both) is contained by value in entity 16.

The mapping between a relational database table 22 of a data store and entity 16 and its dependents 10 and 12 is conceptually illustrated by the arrow 24. Table 22 includes a tiebreaker column 26, the first row of which is illustrated as having stored therein the exemplary value "X". Any suitable values of any suitable type, such as characters or numbers, may be stored in the tiebreaker column. As described in further detail below in connection with an example involving a business order database, when an application program (not shown) references entity 16 to retrieve it from the data store, entity 16 and one of dependents 10 and 12 are instantiated and their instance variables restored with values read from the data store. A step in the instantiation process is to create a specific instance of the dependent. The class name of entity 16 is included in a handle 28, which may also include a primary key and other information, as known in the art. Thus, entity 16 can readily be instantiated. Nevertheless, dependents, unlike entities, do not have handles or other means of providing a unique identity by which an application program may reference them. Dependents are instantiated along with their containing objects and cease to exist when their containing objects are deleted. To properly instantiate a dependent, which may map to one of many possible instances, the specific instance of the dependent must be determined. Each specific instance of a dependent is distinguishable or identifiable by instance name.

The tiebreaker column functions as a switch to select a specific instance from among two or more possible specific instances. When the value stored in tiebreaker column 26 is, for example, "X", dependent 10 is instantiated as a specific instance with a certain instance name that is specified in the schema mapping language, as described below. When the value stored in tiebreaker column 26 is, for example, "Y", dependent 12 is instantiated as a specific instance with a name that is specified in the schema mapping language and that is different from that specified for the case when the value is "X". It is important to note that dependents 10 and 12 are different instances of the same class 14 and can be distinguished by their differing names.

Figure 2:
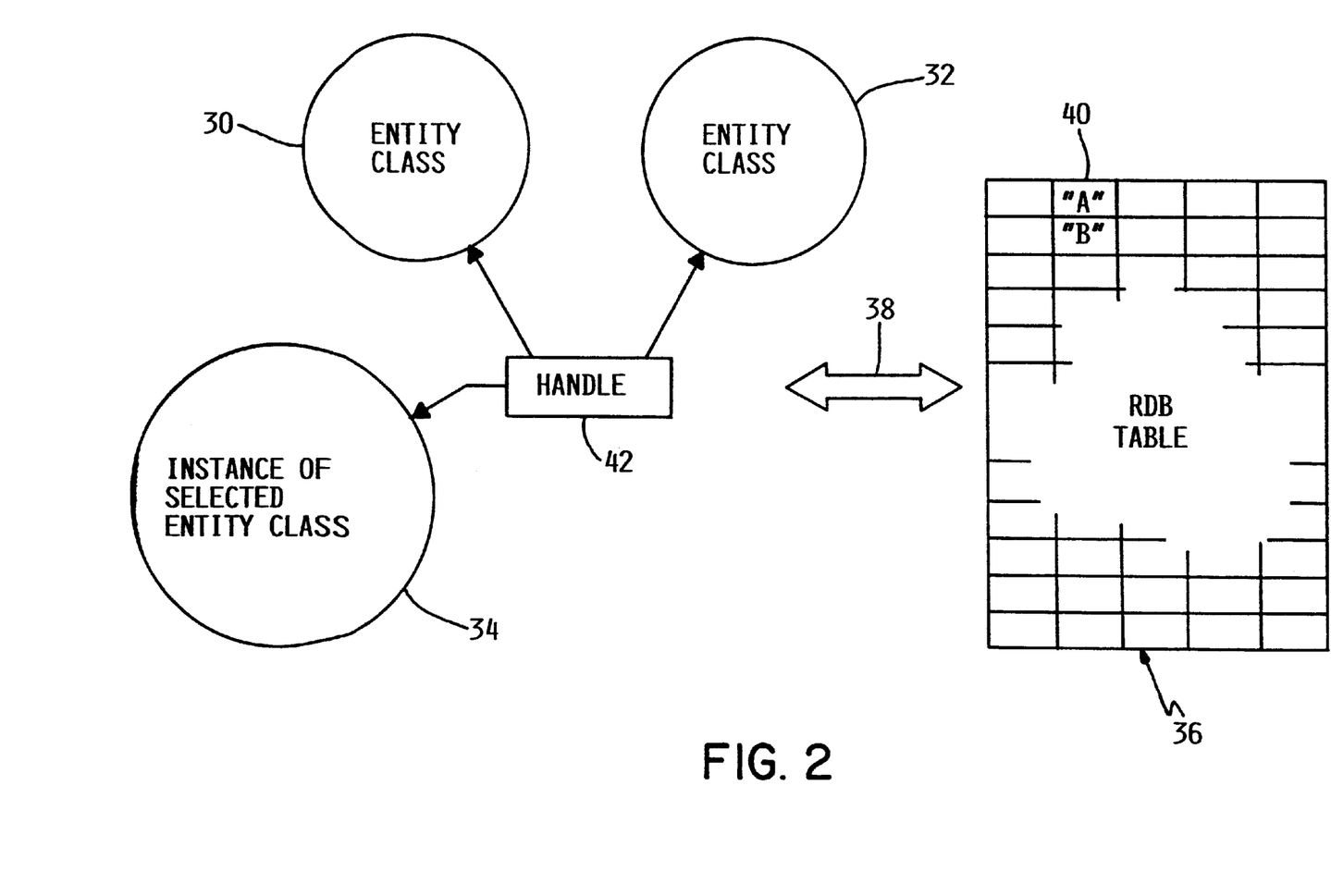
FIG. 2 illustrates mapping entity classes between object schema and relational schema in accordance with a relational table having a tiebreaker column.

As illustrated in FIG. 2, in the case of mapping an entity object, the present invention facilitates selection of an entity class from among two or more such classes, such as between two entity classes 30 and 32. The mapping between an entity 34 and a relational database table 36 of a data store is conceptually illustrated by the arrow 38. Table 36 includes a tiebreaker column 40, the first row of which is illustrated as having stored therein the exemplary value "A". As noted above, any suitable values of any suitable type, such as characters or numbers, may be stored in a tiebreaker column. As described in further detail below in connection with an example involving an employee database, before an application program can request that entity 34 be retrieved from the data store, a handle 42 must be constructed that references entity 34. A handle must contain the class name of the entity it references, in addition to the instance name and other information as described above. The tiebreaker column functions as a switch in this regard to select a class from among two or more possible classes. When the value stored in tiebreaker column 40 is, for example, "A", the name of class 30 is stored in handle 42. When the value stored in tiebreaker column 40 is, for example, "B", the name of class 32 is stored in handle 42. The application program can then properly restore the instance variables of entity 34 with the data read from the data store, because the schema mapping language specifies the mapping of the instance variables of each of classes 30 and 32 to columns of table 36, as described below with regard to an exemplary schema mapping language code listing.

Figure 3:
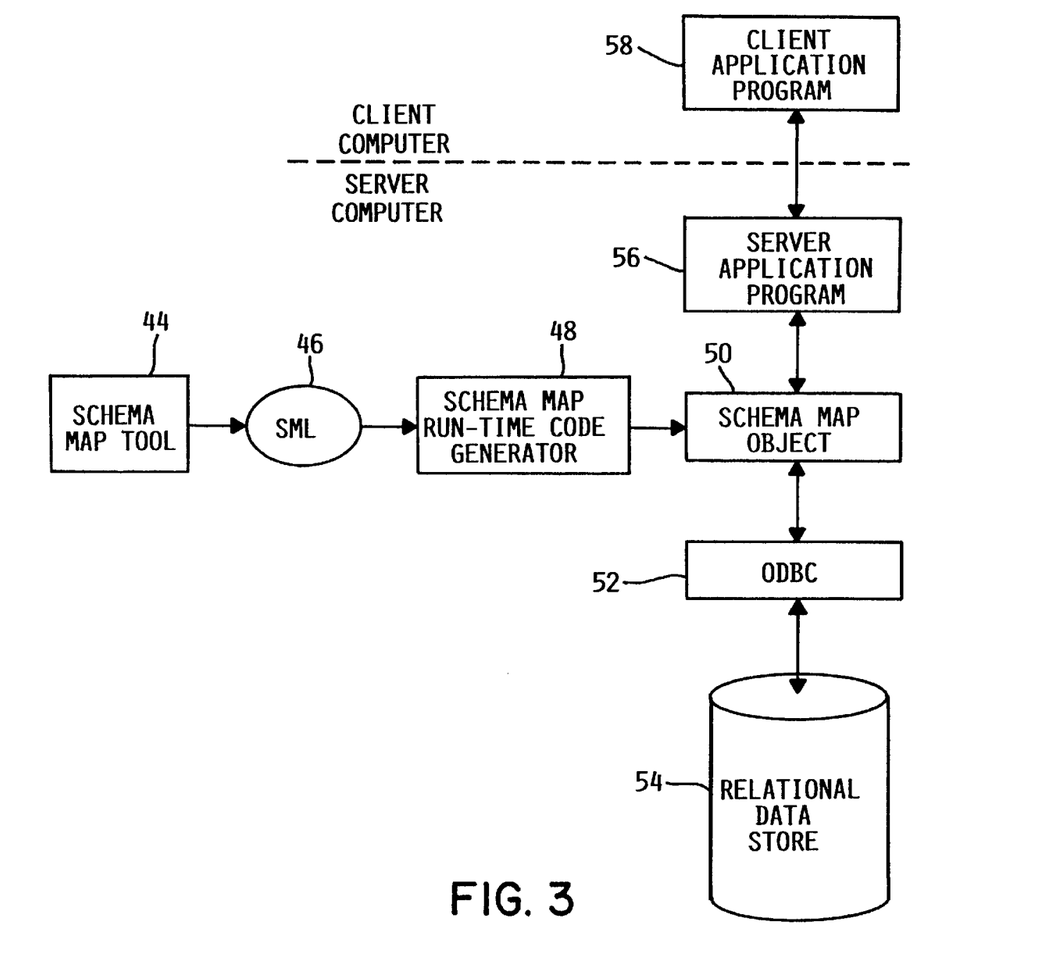
FIG. 3 illustrates a client-server computer system having a relational data store in which the method of the present invention maps between the relational schema of the data store and the object schema of the run-time environment.

As illustrated in FIG. 3, a user may use a schema map tool 44 to generate schema mapping language (SML) 46. SML 46 is a high-level language, the relevant syntax of which is provided in the Appendix to this patent specification. Alternatively, the user may write SML 46 manually. Schema map tool 44 allows the user to define object classes and relational tables and generate a mapping between them. Mapping between object schema and relational schema is described in, for example, U.S. Pat. No. 5,627,979, titled "A SYSTEM AND METHOD FOR PROVIDING A GRAPHICAL USER INTERFACE FOR MAPPING AND ACCESSING OBJECTS IN DATA STORES," (IBM Docket ST9-94-017) incorporated herein by reference, and its related U.S. patent application Ser. No. 08/276,382, filed Jul. 18, 1994, titled "A SYSTEM AND METHOD FOR MAPPING AND ACCESSING OBJECTS IN DATA STORES" (IBM Docket ST9-94-016). Because such mapping systems are known, the full capabilities and features of schema map tool 44 and the SML 46 it generates are not discussed in the present specification. It is sufficient to note that schema map tool 44 and SML 46 have the features described generally above and with respect to specific examples below. Schema map tool 44 and SML 46 may have any other suitable features, such as those described in the above-referenced patent specifications. Although schema map tool 44 and SML 46 may have such features, for purposes of clarity the description in the present specification focuses on those features that relate to the mapping methods of the present invention.

A schema map run-time code generator 48 parses SML 46 and links or connects it with the entities defined in an application program to produce executable or run-time mapping code. A schema map run-time code generator is described in the above-referenced U.S. patent documents. The run-time mapping code is stored in a schema map object 50 and interfaces to open database connectivity (ODBC) driver 52. ODBC driver 52 is software developed by Microsoft Corporation of Redmond, Washington and commercially available from a number of sources. As known in the art, ODBC driver 52 interfaces object-oriented application programs and relational databases, such as the database associated with data store 54. The Java™ database connectivity (JDBC™) driver, developed by Sun Microsystems of Mountain View, Calif., is used in a Java environment to interface object-oriented Java™ application programs and relational databases, and would also be suitable. In keeping with the OOP environment, the application program interfaces are themselves objects whose methods store and retrieve data from data store 54. ODBC driver 52 functions as a call-level interface to data store 54. The ODBC application program interface (API) defines classes that represent database connections, standard query language (SQL) statements, result sets, database metadata, and so forth. Although not shown, the software associated with the present invention preferably further includes a suitable object framework that provides a set of base classes from which a programmer may derive the classes used in the application program.

Although the present invention may be embodied in a non-networked computing system, it is more preferably embodied in a client-server computing system. The application program is distributed between a server application program 56 and a client application program 58 in any suitable manner that is conventional in client-server computing. In a similar vein, although schema map tool 44 is illustrated as part of the server computer, a user may use schema map tool 44 remotely from any suitable computer networked to the server computer. Essentially, the functional elements of the present invention may be distributed among any suitable computing systems that are networked to one another.

Figure 4:
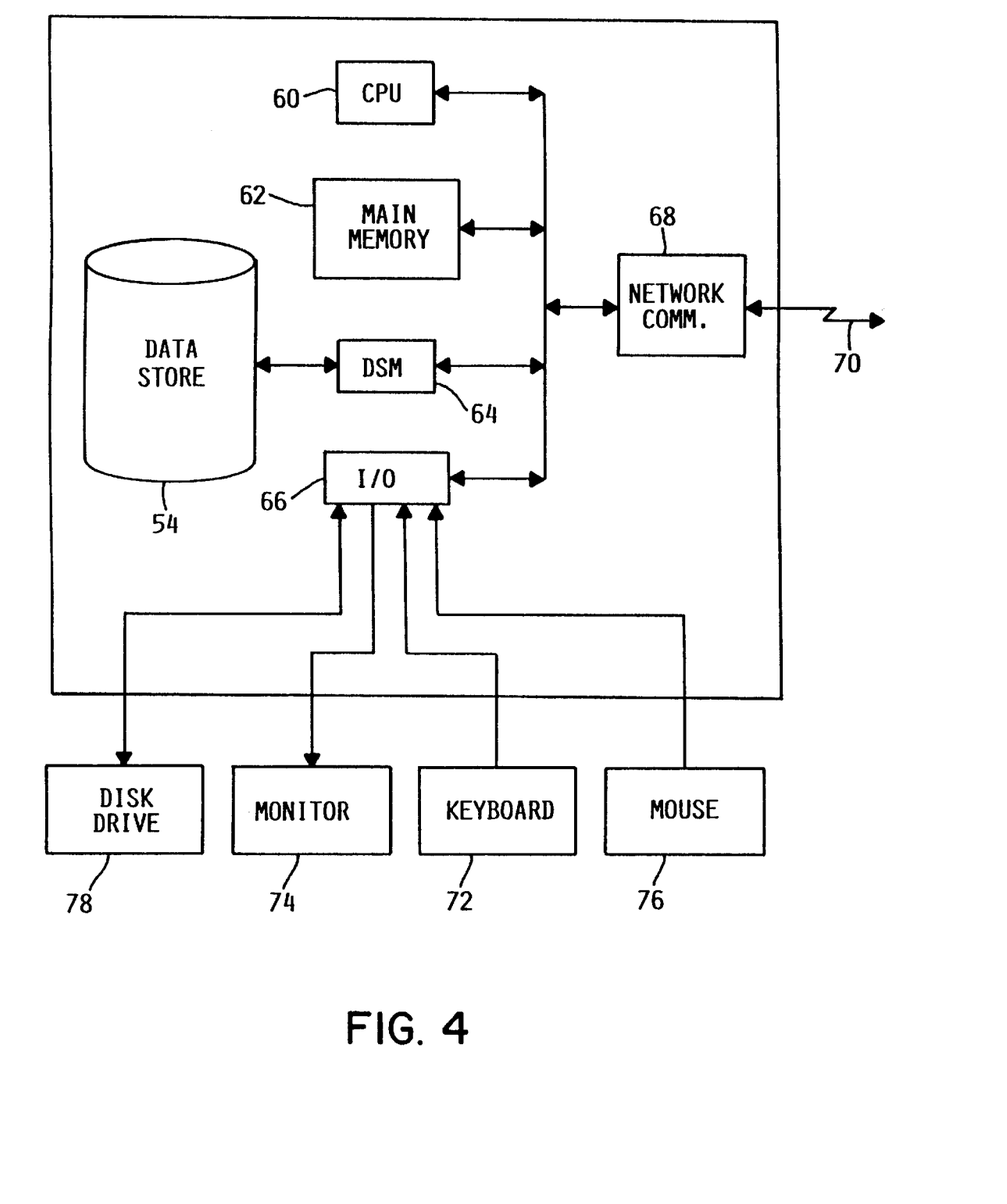
FIG. 4 illustrates a programmed computer for performing the methods of the present invention.

A suitable server computer is illustrated in FIG. 4 and may be programmed in any suitable manner that effects the functions described herein. The computer includes a central processing unit 60, a main memory 62, a data store manager 64, input/output (I/O) interfaces 66, and network communication interfaces 68. A network communication link 70 connects the computer to other computers, such as the client computer (not shown). A user may interact with schema map tool 44 via a keyboard 72, a monitor 74 and a mouse 76. A removable-media disk drive 78, such as a floppy disk drive, is also provided, and may be used for, among other purposes, recording SML 46 or schema map object 50 (FIG. 3). Although data store 54 is illustrated as being integral to the server computer for purposes of clarity and convenience, it may be remotely located and accessed via network communication link 70. Similarly, SML 46 or schema map object 50 may be transmitted to or received from remote computers via network communication link 70.

2.1 An Example of Mapping a Dependent in Accordance with a Tiebreaker Column

With respect to the method of mapping a dependent in accordance with a tiebreaker column illustrated in FIG. 1, the application program treats entity 16 as a persistent object that may be stored in and retrieved from data store 54. Schema map run-time code generator 48 links or connects entity 16 and its dependent with schema map object 50 such that when the application program references the entity 16 by its handle 28, schema map object 50 produces the proper calls to ODBC 52. ODBC 52 retrieves the data into a buffer, which server application program 56 can read to fluff the employee entity, i.e., instantiate it and restore its instance variable with the data. The following example illustrates how schema map object 50 selects a specific instance of the dependent object in accordance with the value stored in a tiebreaker column.

Figure 6:
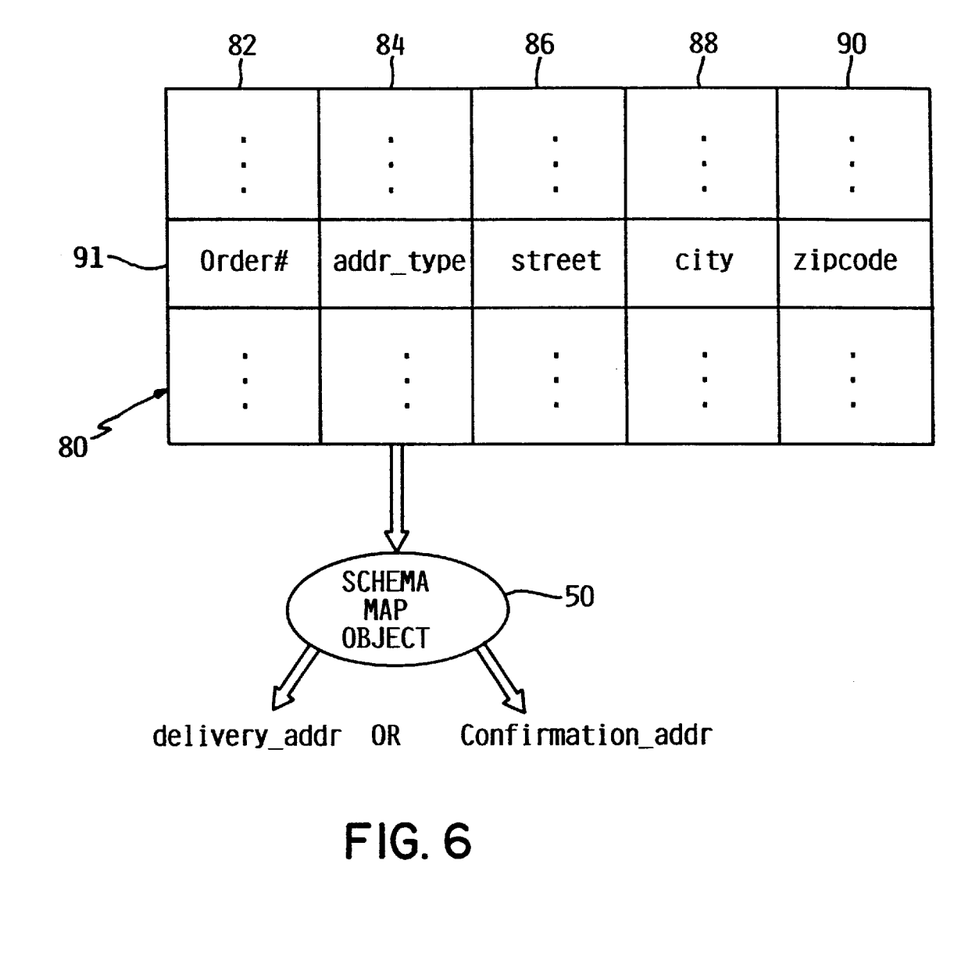
FIG. 6 illustrates a mapping method in which a schema map object selectively maps one of two possible specific instances of a dependent object to a relational table in accordance with a value in the tiebreaker column of the table.

As illustrated in FIG. 6, a table 80 includes a column 82 relating to an order number, a column 84 relating to an address type, a column 86 relating to a street address, a column 88 relating to a city, and a column 90 relating to a zipcode. The data elements corresponding to these columns of an exemplary row 91 are labeled "order#", "addr_type", "street", "city" and "zipcode", respectively. The column 84 in which the address type is stored is a tiebreaker column. In operation, when the application program references the entity corresponding to this row to attempt to retrieve it from the data store, schema map object 50 reads the value stored in column 84. (Although not shown in FIG. 6 for purposes of clarity, schema map object 50 accesses data store 54 via ODBC 52, as described above with respect to FIG. 3.) If the character "D" is stored in column 84, schema map object 50 selects the specific instance identified by the name "delivery_addr" when it instantiates the dependent, e.g., dependent 10 of FIG. 1. If the character "C" is stored in the selected row of column 84, schema map object 50 selects the specific instance identified by the name "confirmation_addr" when it instantiates the dependent, e.g., dependent 12 of FIG. 1.

Although the dependent behaves in the same manner regardless of to which specific instance it belongs, the specific instance may have significance to the application program. For example, the application program may need to perform a different task if an order is placed with a delivery address than it does if an order is placed with a confirmation address. The manner in which the application program uses the presence of a specific instance is a matter of choice for the application programmer and not relevant to the present invention. The present invention is directed to providing the application programmer with the flexibility to determine the specific instance of a dependent in response to the value stored in the tiebreaker column.

Figure 5:
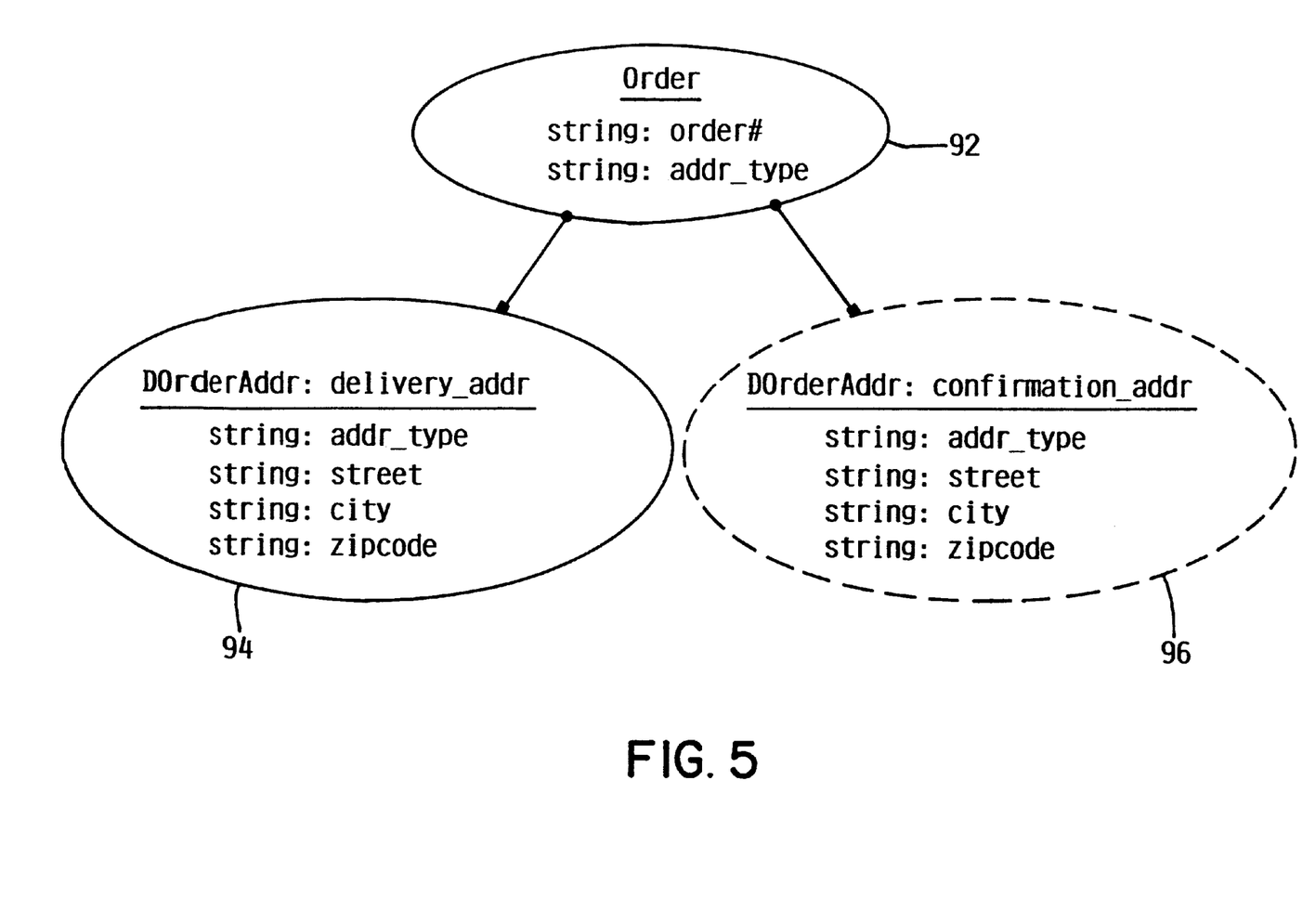
FIG. 5 illustrates an exemplary object hierarchy in which an entity object has one of two possible instances of a dependent subclass.

FIG. 5 illustrates with respect to the present example an object diagram for the selection of the proper specific instance of a dependent class. An entity 92 of an "Order" class includes or owns one of two possible instances of a "DOrderAddr" dependent class. (Under the naming conventions used in this specification, the names of dependent classes begin with an uppercase "D".) One instance, dependent 94, is a specific instance named "delivery_Addr", and the alternative instance, dependent 96, is a specific instance named "confirmation_addr". Because they are of the same class, both dependents 94 and 96 have the same instance variables, namely, an "addr_type", "street", "city" and "zipcode", all of type string.

The following exemplary code, which is written in Java™, defines the classes used in this example:

```
Class Order {
    string order #;
    string addr_type;
    DOrderAddr delivery_addr;
    DOrderAddr confirmation_addr;
}
Class DOrderAddr {
    string addr_type;
    string street;
    string city;
    string zipcode;
}
Class DOrderKey {
    string order#;
    string addr_type;
}
```

The application program may be written in any suitable OOP language, such as C++or, more preferably, Java™. The nature of the application program is not directly relevant to the present invention and is thus not described. For purposes of the present invention, it is sufficient to note that the application program should define the classes and their instance variables, such as those described in the example above. Similarly, the application program may use any suitable keys in accessing the data store. This example assumes that the application program uses "order#" and "addr_type" as primary keys.

The following is a code listing of the SML 46 that defines the above-described exemplary mapping between relational tables and object schema. Although the code may be immediately understood by many persons skilled in the art because the language is similar to SQL, further information is provided in the form of syntax diagrams, explanatory remarks and further examples in an Appendix to this specification. Furthermore, other schema mapping languages may also be suitable.

```
CLASS AddrPkg.Order
    PRIMARYKEY AddrPkg.DOrderKey
        PRIMARY_KEYFIELD order# String FIELD order#
        PRIMARY_KEYFIELD addr_type String FIELD
            addr_type
    END_PRIMARYKEY
    FIELD order# String COLUMN
    Ordertable.order# DECIMAL (9,0)
            NOTNULL
    FIELD addr_type String COLUMN
    Ordertable.addr_type CHAR(1)
            NOTNULL
    OBJECT deliver_addr AddrPkg.DOrderAddr
    ISOBJECT_WHEN
            (COLUMN addr_type CHAR(1) = 'D')
        SMLFILE DOrderAddress.sml
    END_OBJECT
    OBJECT confirmation_addr AddrPkg.DOrderAddr
    ISOBJECT_WHEN
            (COLUMN addr_type CHAR(1) = 'C')
        SMLFILE DOrderAddress.sml
    END_OBJECT
END_CLASS AddrPkg.Order
CLASS AddrPkg.DOrderAddr
    FIELD addr_type String COLUMN
    Ordertable.addr_type CHAR(1)
    FIELD street String COLUMN
    Ordertable.street VARCHAR(30)
    FIELD city String COLUMN
    Ordertable.city VARCHAR(15)
    FIELD zipcode String COLUMN
    Ordertable.zipcode CHAR(9)
END_CLASS AddrPkg.DOrderAddr
```

The above-listed SML code defines a class "Order" in a directory "AddrPkg". Using the tag PRIMARY_KEYFIELD, the order number instance variable "order#" and the address type instance variable "addr_type" are designated as the primary keyfields of the relational schema. Because the relational schema relates to legacy or existing data, it will already have one or more primary keyfields, and the user must designate them. With reference to FIGS. 5 and 6, using the tag FIELD, the order number instance variable "order#" is mapped to a "order#" column 82 of an "Ordertable" table 80. Similarly, the address type instance variable "addr_type" is mapped to an "addr_type" column 84.

The SML code also defines the dependent class "DOrderAddr" in the directory "AddrPkg". The instance variable "addr_type" is mapped to the "addr_type" column 84; the instance variable "street" is mapped to the "street" column 86; the instance variable "city" is mapped to the "city" column 88; and the instance variable "zipcode" is mapped to the "zipcode" column 90.

Most importantly with regard to the present invention, the SML code maps the dependent object of class "DOrderAddr" defined in the Java™ class definitions above. Using the tag "OBJECT", followed by an instance name, followed by the conditional "ISOBJECT . . . WHEN" tag, the code states that: the name of the specific instance of the "DOrderAddr" class is "delivery_addr" when the value "D" is stored in the "addr_type" (tiebreaker) column 84; and, alternatively, the name of the specific instance of the "DOrderAddr" class is "confirmation_addr" when the value "C" is stored in the "addr_type" column 84.

Figure 7:
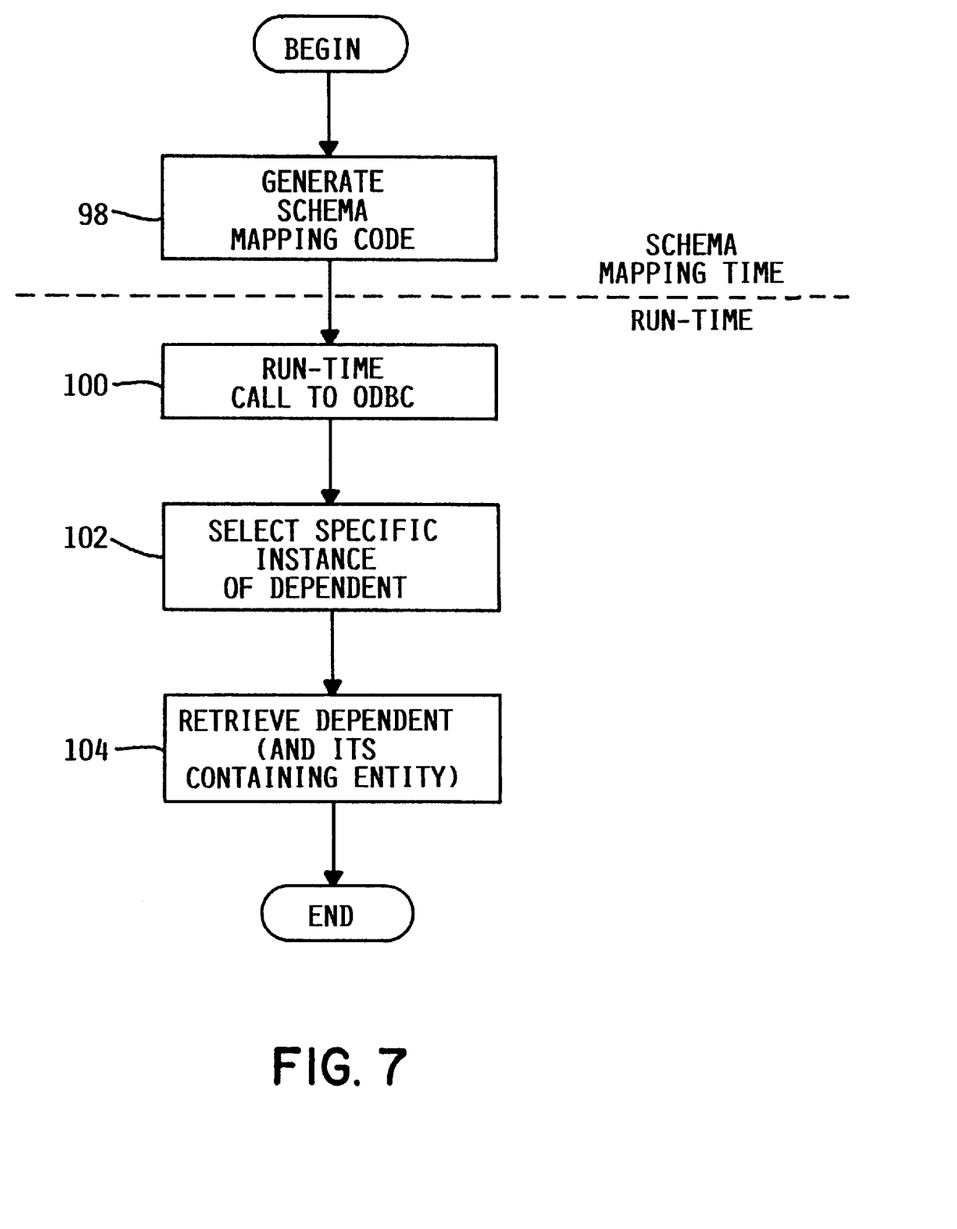
FIG. 7 is a flow chart illustrating a method of retrieving a persistent dependent object in accordance with the mapping method of FIG. 6.

The flow diagram illustrated in FIG. 7 outlines the method described above with respect to the example. Prior to the time the application program is executed, i.e., prior to run-time, at step 98 the user generates SML 46, either manually or with the aid of schema map tool 44. (See FIG. 3.) SML 46 and schema map object 50 (FIG. 3) represent the mapping. When the application program references an entity at run-time, a call to ODBC 52 is initiated at step 100.

Schema map object 50 selects the proper specific instance of the entity's dependent in response to the value read from the tiebreaker column. At step 104 the application program completes the retrieval of the dependent (as well as its containing entity) by instantiating it as the selected specific instance and, using the classes provided by the handle as a template, fluffing the entity, i.e., restoring the entity's instance variables with values read from the data store.

2.2 An Example of Mapping an Entity in Accordance with a Tiebreaker Column

With respect to the method of mapping an entity in accordance with a tiebreaker column illustrated in FIG. 2, the application program must obtain handle 42 before it can retrieve entity 34 from data store 54 (FIG. 3). The following example illustrates how schema map object 50 selects the entity class in accordance with a value stored in a tiebreaker column and causes handle 42 to be constructed.

Figure 8:
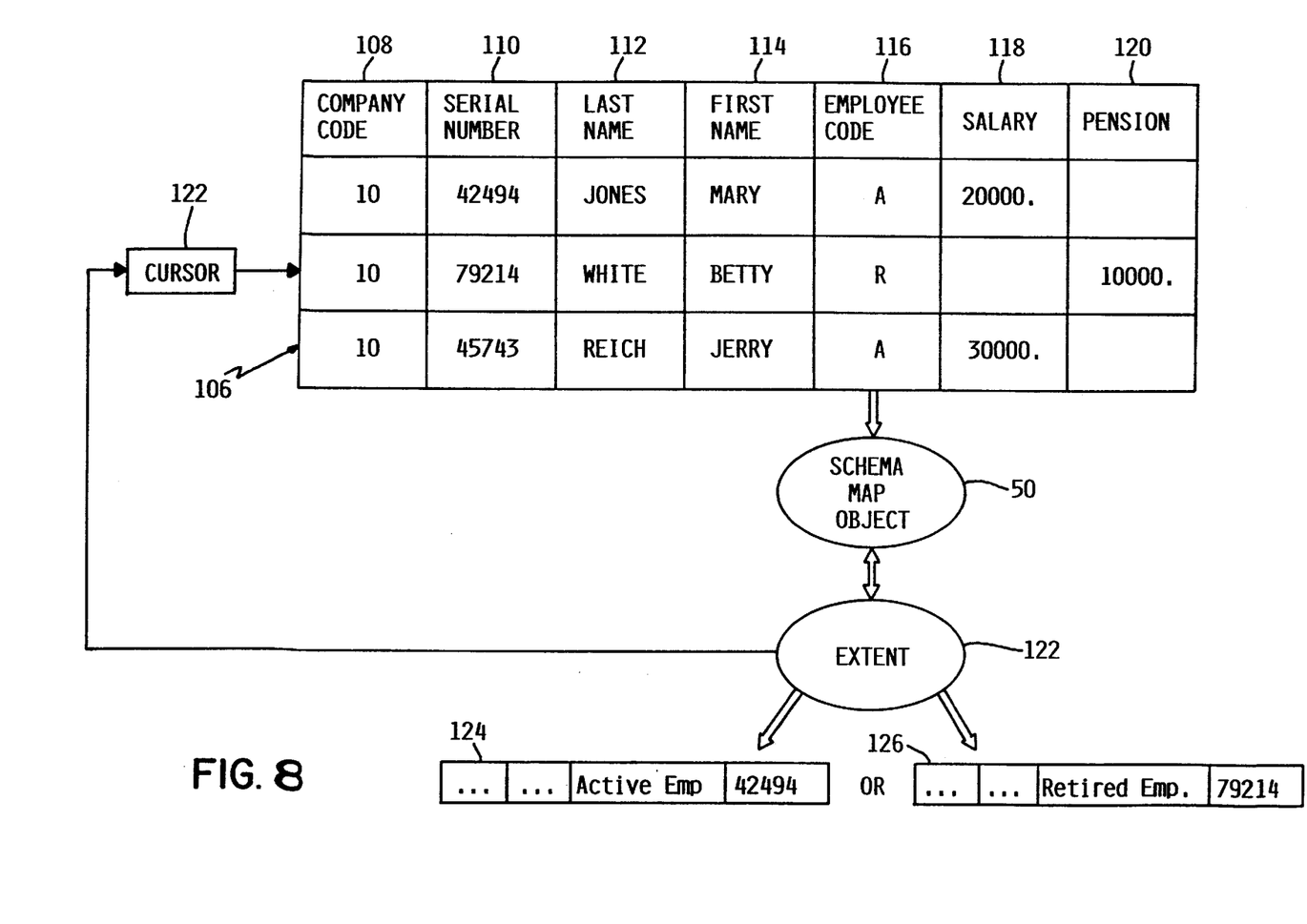
FIG. 8 illustrates a mapping method in which a schema map object selectively maps one of two possible classes of an entity object to a relational table in accordance with a value in the tiebreaker column of the table, and in which a handle constructing object builds a handle having the selected class.

As illustrated in FIG. 8, a table 106 includes a column 108 relating to a company code, a column 110 relating to a serial number, a column 112 relating to a last name, a column 114 relating to a first name, a column 116 relating to an employee code, a column 118 relating to a salary, and a column 120 relating to a pension. Column 116, in which the employee code is stored, is a tiebreaker column. Three exemplary rows are illustrated, each representing an employee. Employee Mary Jones is an active employee, as indicated by the "A" in column 116. She works for a company having a company code of "10." Her employee number or serial number is "42494," and her salary is 20,000. Employee Betty White is a retired employee, as indicated by the "R" in the column 116. She worked for company "10," and her serial number was "79214." She now receives a pension of 10,000. Employee Jerry Reich is an active employee working for company "10" as well. His serial number is "45743," and his salary is 30,000.

An object-oriented application program typically accesses a relational database table via an object commonly known as an extent or collection. In the example above, relating to dependents, a discussion of extents was omitted for the sake of clarity in order to focus upon the relevant features of the invention. In describing the method of selecting the proper specific instance of a dependent in response to a tiebreaker column, it was assumed that a handle referencing the entity containing the dependent had already been obtained in a conventional manner. To better describe the method of selecting a class of an entity in response to a tiebreaker column, the following concept of an extent and its role in constructing a handle is introduced.

To access a persistent entity, the application program invokes the services of an extent. The primary function of an extent is to allow an application program to focus on only those rows of the table that are likely to correspond to the entity to be retrieved. This focusing is commonly referred to as partitioning. In the example of FIG. 8, an extent 122 partitions table 106 along a value "10" in column 108 because the application program is only concerned with employees of the company having the code of "10." Partitioning a table along a value of a column eliminates reading the entire table, which may include many rows that are known not to include the row corresponding to the entity to be retrieved. It is common to refer to the result as a "view over the table" that is "wrapped" into the extent. While providing a view over the table is the primary function of an extent, an extent is also responsible for constructing handles to objects to be retrieved.

In operation, an application program accesses the elements of the table by causing the extent to open an iterator over the view. An iterator is a well-known feature of an extent. The extent, in turn, opens a cursor, such as cursor 122, that initially points to the first row of the table. A cursor is a well-known feature of a relational search engine and corresponds to the iterator object. Although not shown in FIG. 8 for purposes of clarity, ODBC 52 interfaces extent 122 to cursor 122 in the conventional manner. An application program may reference a certain persistent entity that it desires to retrieve from the data store by causing the extent to iterate row-by-row until it reaches the row corresponding to the entity. The extent may determine the number of rows to iterate by referring to a primary key table (not shown), as known in the art. When it reaches the row, such as the row of table 106 corresponding to employee Betty White, the extent requests a handle by invoking a handle-constructing method (e.g., "getHandle") on schema map object 50. The extent returns the handle to the application program. Using the information provided in the handle, such as the classes and subclasses of the entity and its dependent(s), the application program can instantiate the entity and fluff it with the data read from the row.

In response to the request for a handle, schema map object 50 reads the value stored in column 116. (Although not shown in FIG. 6 for purposes of clarity, schema map object 50 accesses data store 54 via ODBC 52, as described above with respect to FIG. 3.) If the character or string "A" is stored in column 116, schema map object 50 selects the class "ActiveEmp". If the character or string "R" is stored in column 116, schema map object 50 selects the class "RetiredEmp". Extent 122 then constructs either handle 124 if the class is "ActiveEmp" or handle 126 if the class is "RetiredEmp". Because the handle includes the proper class name, the application program can properly fluff the entity. If, for example, the application program receives handle 126, it restores the instance variable corresponding to a pension with the value read from column 120. If the application program receives handle 124, it reads column 118 and restores the instance variable corresponding to a salary with the value read from column 118. The relationship between the instance variables of the entity and the schema mapping will become more apparent in view of the following exemplary SML code, which is written in Java™. The following code section defines the classes used in this example:

```
Class Employee {
    int companyCode;
    string serialNumber;
    string lastName;
    string firstName;
}
Class ActiveEmp extends Employee {
    float salary;
}
Class RetiredEmp extends Employee {
    float pension;
}
```

The application program may be written in any suitable OOP language, such as C++or, more preferably, Java™. As in the example in section 2.1 above, the nature of the application program is not directly relevant to the present invention and is thus not described. For purposes of the present invention, it is sufficient to note that the application program should define the classes and their instance variables, such as those described in the example above. Similarly, the application program may use any suitable keys in accessing the data store. This example assumes that the application program uses the instance variable "serialNumber" as a primary key.

The following is a code listing of the SML 46 that defines the above-described exemplary mapping between relational tables and object schema:

```
CLASS Account.Employee
PRIMARYKEY Account.DEmpKey
    PRIMARY_KEYFIELD
        serialNumber String FIELD serialNumber
END_PRIMARYKEY
FIELD companyCode int COLUMN emptable.company INT
FIELD serialNumber string COLUMN
emptable.serno CHAR(5)
FIELD lastName string COLUMN
emptable.lastname VARCHAR(20)
FIELD firstName string COLUMN
emptable.firstname VARCHAR(20)
SUBCLASS Account.Employee.ActiveEmp
    FIELD salary float COLUMN emptable.salary REAL
END_SUBCLASS
SUBCLASS Account.Employee.RetiredEmp
    FIELD pension float COLUMN emptable.pension REAL
END_SUBCLASS
CLASSIS Account.ActiveEmp WHEN emptable.code CHAR(1)
    NOTNULL = 'A')
CLASSIS Account.RetiredEmp WHEN emptable.code CHAR(1)
    NOTNULL = 'R')
END_CLASS Account.Employee
```

The above-listed SML code defines a class "Employee" in a directory "Account". Using the tag PRIMARY_KEYFIELD, the instance variable "serialNumber", which is of type string, is designated as the primary keyfield of the relational schema. Using the tag FIELD, the "companyCode" instance variable, which is of type integer ("int") is mapped to a column "company" in table "emptable" (with reference to FIG. 8, column 108 in table 106). Similarly, the "serialNumber" instance variable, which is of type string, is mapped to a column "serno" in table "emptable" (with reference to FIG. 8, column 110 in table 106). Also, the "lastName" instance variable, which is of type string, is mapped to a column "lastname" in table "emptable" (with reference to FIG. 8, column 112 in table 106). Finally, the "firstName" instance variable, which is of type string, is mapped to a column "firstname" in table "emptable" (with reference to FIG. 8, column 114 in table 106).

The SML code also defines the subclass "ActiveEmp," which is a subclass of class "Employee," in the directory "Account". The instance variable "salary" is mapped to the "salary" column (with reference to FIG. 8, column 118 of table 106). The SML code also defines a subclass "RetiredEmp," which is a subclass of class "Employee," in the directory "Account". The instance variable "pension" is mapped to the "pension" column (with reference to FIG. 8, column 120 of table 106).

Most importantly with regard to the present invention, the SML code selects the proper subclass of the Employee entity. Using the tag "CLASSIS . . . WHEN", the SML code states that the class (in this case, a subclass) is "ActiveEmp" when the value stored in the "code" column of "emptable" (column 116 of table 106) is the character "A". Similarly, the code states that the class is "RetiredEmp" when the value stored in the "code" column is the character "R". The tag "NOTNULL" specifies that the column is not allowed to contain null values.

Figure 9:
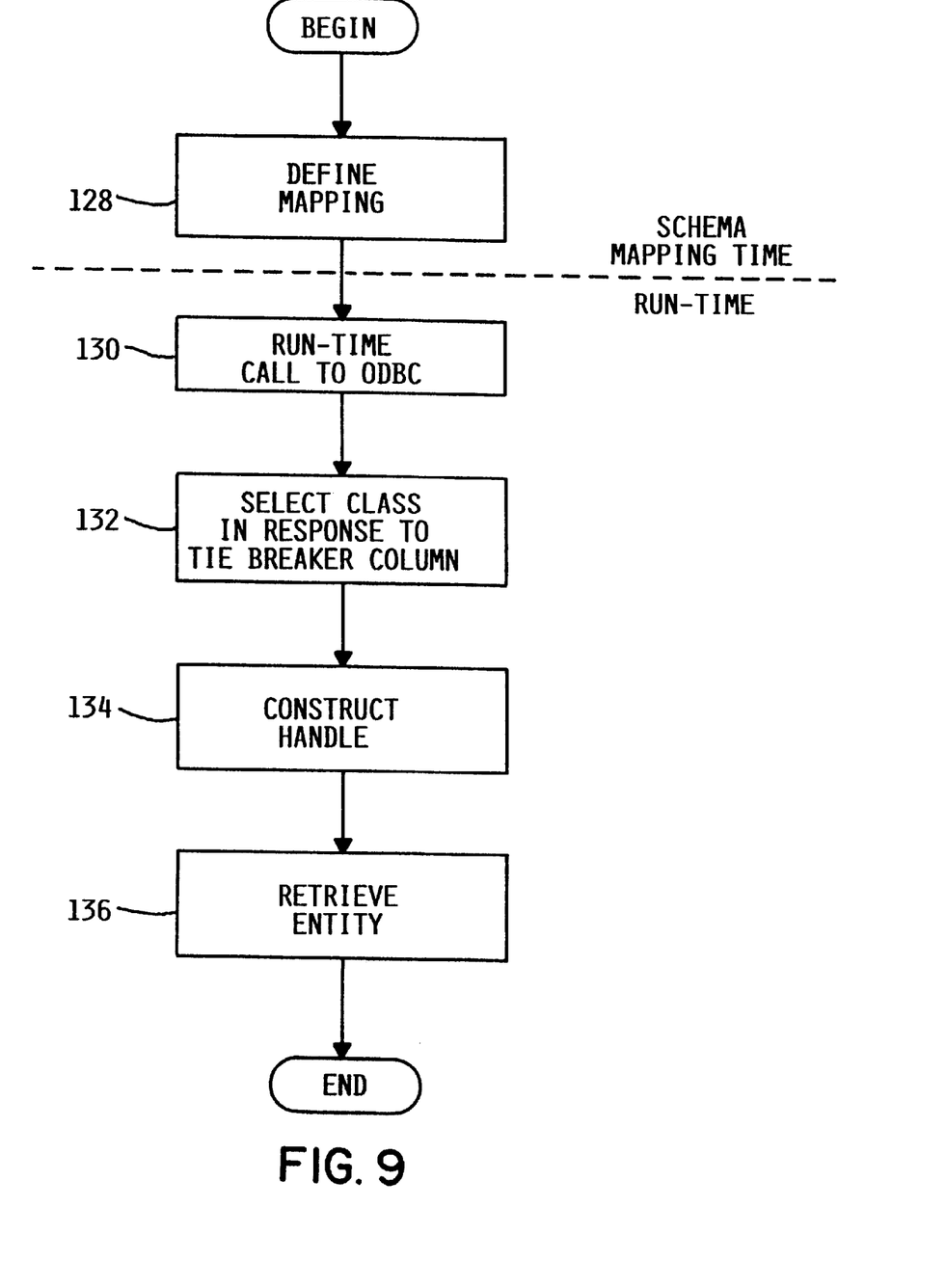
FIG. 9 illustrates a method of retrieving a persistent entity object in accordance with the mapping method of FIG. 8.

The flow diagram illustrated in FIG. 9 outlines the method described above with respect to the example. Prior to the time the application program is executed, i.e., prior to run-time, at step 128 the user generates SML 46, either manually or with the aid of schema map tool 44. (See FIG. 3.) SML 46 and schema map object 50 represent the mapping. When the application program attempts to retrieve an entity at run-time, a call to ODBC 52 is initiated at step 130 to read the tiebreaker column. The application program may invoke the services of an extent to retrieve the entity. At step 132 schema map object 50 selects the class or subclass of the entity in response to the value read from the tiebreaker column. At step 134 the extent or other handle constructing object causes a handle to be constructed that includes the selected class or subclass. When the application program references the entity at step 136 by invoking a retrieval method (e.g., "getEntity") on the handle, schema map object 50 instantiates the entity and, using the classes provided by the handle as a template, fluffs the entity, i.e., restores the entity's instance variables with values read from the data store.

As described above, aspects of the present invention pertain to a method and system embodied in a standalone, distributed, or other computer system. Nevertheless, the invention may alternatively be embodied as a computer program product for use with a computer system. The programs defining the SML, run-time code and functions of the present invention can be delivered to a computer system via a variety of signal-bearing media, which may include both recordable-type media and transmission-type media. Examples of recordable-type media include, but are not limited to: (a) information permanently stored on non-writeable storage media (e.g., read-only memory devices within a computer, such as a read-only portion of memory 62 in FIG. 4); and (b) alterable information stored on writeable storage media (e.g., floppy disks within a media drive such as disk drive 78 in FIG. 4). Examples of transmission-type media include conventional computer networks such as network link 70 (FIG. 4), as well as telephone networks, cable television networks, satellite broadcast networks, other wireless communication systems, and combinations thereof. Therefore, it should be understood that such signal-bearing media, when carrying computer readable instructions that direct the method functions of the present invention, represent alternative embodiments of the present invention.

Other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A computer-implemented method for mapping an object between object-oriented schema and relational data store schema, said object having a class, said relational data store schema defined by a plurality of attribute columns and a tiebreaker column, the method comprising the steps of:

generating mapping software code in a high-level language, said mapping software code defining a selection of said class from among a plurality of classes in response to a value in said tiebreaker column, each class of said plurality of classes corresponding to one of a plurality of values; and constructing a handle including a reference to said class.

2. The computer-implemented method recited in claim 1, further comprising the step of initiating an application program run-time call to an object database driver referencing said object by said handle, said object database driver accessing data elements from said attribute columns of said data store and associating said data elements with instance variables of said object in response to said application program run-time call and said reference to said class.

3. A computer-implemented method for mapping an object between object-oriented schema and relational data store schema, said object having a class, said relational data store schema defined by a plurality of attribute columns and a tiebreaker column, the method comprising the steps of:

generating mapping software code in a high-level language, said mapping software code defining a selection of a specific instance of said class from among a plurality of specific instances of said class in response to a value in said tiebreaker column, each specific instance corresponding to one of a plurality of values; and     initiating an application program run-time call to an object database driver referencing an object, said object database driver accessing data elements from said attribute columns of said data store and associating said data elements with instance variables of said object in response to said application program run-time call and said mapping software code.

4. The computer-implemented method recited in claim 3, wherein said object mapped between object-oriented schema and relational data store schema is a dependent object, and said run-time call referencing an object is a run-time call to an entity object containing said dependent object.

5. A computer-implemented method for selectively mapping an object between object-oriented schema and relational data store schema, said object having a class, said relational data store schema defined by a plurality of attribute columns and a tiebreaker column, the method comprising the steps of:

generating mapping software code in a high-level language;

wherein if said object is an entity object said mapping software code defines a selection of said class from among a plurality of classes in response to a value in said tiebreaker column, each class of said plurality of classes corresponding to one of a plurality of values; and     wherein if said object is a dependent object said mapping software code defines a selection of a specific instance of said class from among a plurality of specific instances of said class in response to a value in said tiebreaker column, each specific instance corresponding to one of a plurality of values.

6. A system for mapping an object between object-oriented schema and relational data store schema, said object having a class, said relational data store schema defined by a plurality of attribute columns and a tiebreaker column, the system comprising:

a mapping software code generator for generating mapping software code in a high-level language, said mapping software code defining a selection of said class from among a plurality of classes in response to a value in said tiebreaker column, each class of said plurality of classes corresponding to one of a plurality of values; and     a handle constructor for constructing a handle including a reference to said class.

7. The system recited in claim 6, further comprising an object database driver, wherein an application program run-time call from an application program running on a computer references said object by said handle, and said object database driver accesses data elements from said attribute columns of said data store and associates said data elements with instance variables of said object in response to said application program run-time call and said reference to said class.

8. A system for mapping an object between object-oriented schema and relational data store schema, said object having a class, said relational data store schema defined by a plurality of attribute columns and a tiebreaker column, the system comprising:

a mapping software code generator for generating mapping software code in a high-level language, said mapping software code defining a selection of a specific instance of said class from among a plurality of specific instances of said class in response to a value in said tiebreaker column, each specific instance corresponding to one of a plurality of values; and     an object database driver, wherein an application program run-time call from an application program running on a computer references an object, and said object database driver accesses data elements from said attribute columns of said data store and associates said data elements with instance variables of said object in response to said application program run-time call and said mapping software code.

9. The system recited in claim 8, wherein said object mapped between object-oriented schema and relational data store schema is a dependent object, and said run-time call referencing an object is a run-time call to an entity object containing said dependent object.

10. A system for selectively mapping an object between object-oriented schema and relational data store schema, said object having a class, said relational data store schema defined by a plurality of attribute columns and a tiebreaker column, the system comprising:

a mapping software code generator for generating mapping software code in a high-level language, said mapping software code generator producing, in response to a selection provided by a user, either an entity mapping or a dependent mapping;

wherein if said user selects entity mapping said mapping software code defines a selection of said class from among a plurality of classes in response to a value in said tiebreaker column, each class of said plurality of classes corresponding to one of a plurality of values; and     wherein if said user selects dependent mapping said mapping software code defines a selection of a specific instance of said class from among a plurality of specific instances of said class in response to a value in said tiebreaker column, each specific instance corresponding to one of a plurality of values.

11. A computer program product for use in a computer system for mapping an object between object-oriented schema and relational data store schema, said object having a class, said relational data store schema defined by a plurality of attribute columns and a tiebreaker column, said computer program product comprising a signal-bearing medium carrying thereon:

mapping software code defining a selection of said class from among a plurality of classes in response to a value in said tiebreaker column, each class of said plurality of classes corresponding to one of a plurality of values; and     handle construction software code for constructing a handle including a reference to said class.

12. A computer program product for mapping an object between object-oriented schema and relational data store schema, said object having a class, said relational data store schema defined by a plurality of attribute columns and a tiebreaker column, said computer program product comprising a signal-bearing medium carrying thereon:

mapping software code defining a selection of a specific instance of said class from among a plurality of specific instances of said class in response to a value in said tiebreaker column, each specific instance corresponding to one of a plurality of values; and a connection between said mapping software code and a selected specific instance of said class, wherein an application program run-time call from an application program running on a computer references an object, and said object database driver accesses data elements from said attribute columns of said data store and associates said data elements with instance variables of said object in response to said application program run-time call and said mapping software code.

13. The computer program product recited in claim 12, wherein said object mapped between object-oriented schema and relational data store schema is a dependent object, and said run-time call referencing an object is a run-time call to an entity object containing said dependent object.

14. A computer program product for selectively mapping an object between object-oriented schema and relational data store schema, said object having a class, said relational data store schema defined by a plurality of attribute columns and a tiebreaker column, said computer program product comprising a signal-bearing medium carrying thereon:

a mapping software code generator for generating mapping software code in a high-level language, said mapping software code generator producing, in response to a selection provided by a user, either an entity mapping or a dependent mapping;

wherein if said user selects entity mapping, said mapping software code defines a selection of said class from among a plurality of classes in response to a value in said tiebreaker column, each class of said plurality of classes corresponding to one of a plurality of values; and wherein if said user selects dependent mapping, said mapping software code defines a selection of a specific instance of said class from among a plurality of specific instances of said class in response to a value in said tiebreaker column, each specific instance corresponding to one of a plurality of values.

* * * * *